US012448539B2

(12) United States Patent
Peng et al.

(10) Patent No.: US 12,448,539 B2
(45) Date of Patent: Oct. 21, 2025

(54) SEALANT COMPOSITION

(71) Applicants: DOW SILICONES CORPORATION, Midland, MI (US); ROHM AND HAAS COMPANY, Collegeville, PA (US)

(72) Inventors: Jiang Peng, Shanghai (CN); Yi Guo, Shanghai (CN); Nanguo Liu, Midland, MI (US); Nick Shephard, Auburn, MI (US); Ye Wu, Shanghai (CN); Matt Olsen, Wilmington, DE (US)

(73) Assignees: DOW SILICONES CORPORATION, Midland, MI (US); ROHM AND HAAS COMPANY, Collegeville, PA (US)

( * ) Notice: Subject to any disclaimer, the term of this patent is extended or adjusted under 35 U.S.C. 154(b) by 580 days.

(21) Appl. No.: 17/786,408

(22) PCT Filed: Dec. 17, 2019

(86) PCT No.: PCT/CN2019/125814
§ 371 (c)(1),
(2) Date: Jun. 16, 2022

(87) PCT Pub. No.: WO2021/119970
PCT Pub. Date: Jun. 24, 2021

(65) Prior Publication Data
US 2023/0024520 A1    Jan. 26, 2023

(51) Int. Cl.
| C09D 183/04 | (2006.01) |
| C08K 3/36 | (2006.01) |
| C08K 5/5419 | (2006.01) |
| C08K 5/544 | (2006.01) |
| C08K 9/06 | (2006.01) |
| C09J 11/08 | (2006.01) |
| C09J 183/04 | (2006.01) |
| C08G 77/18 | (2006.01) |

(52) U.S. Cl.
CPC ............ C09D 183/04 (2013.01); C08K 3/36 (2013.01); C08K 5/5419 (2013.01); C08K 5/544 (2013.01); C08K 9/06 (2013.01); C09J 11/08 (2013.01); C09J 183/04 (2013.01); C08G 77/18 (2013.01); C08L 2205/025 (2013.01); C08L 2205/03 (2013.01); C08L 2312/00 (2013.01)

(58) Field of Classification Search
CPC .................................................... C08G 77/08
See application file for complete search history.

(56) References Cited

U.S. PATENT DOCUMENTS

| 3,105,061 | A | 9/1963 | Bruner |
| 3,635,887 | A | 1/1972 | Polmanteer |
| 3,996,184 | A | 12/1976 | Klosowski |
| 4,515,932 | A | 5/1985 | Chung |
| 4,680,364 | A | 7/1987 | Lucas |
| 4,962,152 | A | 10/1990 | Leempoel |
| 5,017,628 | A | 5/1991 | Dietlein |
| 5,053,442 | A | 10/1991 | Chu et al. |
| 5,300,608 | A | 4/1994 | Chu et al. |
| 5,489,479 | A | 2/1996 | Lucas et al. |
| 5,519,104 | A | 5/1996 | Lucas |
| 5,674,936 | A | 10/1997 | Lucas |
| 6,162,756 | A | 12/2000 | Friebe et al. |
| 6,562,931 | B1 | 5/2003 | Knepper |
| 6,703,442 | B1 | 3/2004 | Ando et al. |
| 7,504,468 | B2 | 3/2009 | Guennouni et al. |
| 8,067,508 | B2 | 11/2011 | Braun et al. |
| 8,153,261 | B2 | 4/2012 | Landon et al. |
| 11,168,213 | B2 | 11/2021 | Huang et al. |
| 2003/0216536 | A1 | 11/2003 | Levandoski et al. |
| 2005/0288415 | A1 | 12/2005 | Beers et al. |
| 2006/0074183 | A1 | 4/2006 | Sakamoto et al. |
| 2007/0088110 | A1 | 4/2007 | Kohl et al. |
| 2007/0237912 | A1 | 10/2007 | Correia |
| 2010/0099793 | A1 | 4/2010 | Wunder |
| 2010/0139843 | A1 | 6/2010 | DeCato |
| 2010/0234510 | A1* | 9/2010 | Feder ..................... C08K 5/09 524/588 |
| 2010/0317796 | A1 | 12/2010 | Huang et al. |
| 2011/0198779 | A1 | 8/2011 | Davio et al. |
| 2013/0023602 | A1 | 1/2013 | Dorman |
| 2013/0338289 | A1 | 12/2013 | Jadot et al. |
| 2014/0235812 | A1 | 8/2014 | Brandstadt et al. |
| 2014/0288222 | A1 | 9/2014 | Yano et al. |
| 2014/0343202 | A1 | 11/2014 | Dinkar et al. |
| 2015/0031841 | A1 | 1/2015 | Horstman et al. |

(Continued)

FOREIGN PATENT DOCUMENTS

| CN | 1382183 A | 11/2002 |
| CN | 1597824 A | 3/2005 |

(Continued)

OTHER PUBLICATIONS

Machine translation of JP 5045861 (no date).*
Machine assisted English translation of CN1597828A obtained from https://patents.google.com/patent on Jan. 12, 2023, 7 pages.
Machine assisted English translation of FR1494500A obtained from https://worldwide.espacenet.com/patent on Jun. 21, 2023, 6 pages.
Machine assisted English translation of CN102952270A obtained from https://patents.google.com/patent on Aug. 24, 2022, 9 pages.
Machine assisted English translation of CN103396757A obtained from https://patents.google.com/patent on Aug. 24, 2022, 9 pages.
Machine assisted English translation of CN103408941A obtained from https://patents.google.com/patent on Aug. 24, 2022, 8 pages.

(Continued)

Primary Examiner — Marc S Zimmer
(74) Attorney, Agent, or Firm — WARNER NORCROSS + JUDD LLP

(57) ABSTRACT

A one-part room temperature vulcanisable (RTV) silicone composition containing a catalyst comprising (i) a titanate and/or zirconate and (ii) a metal carboxylate salt which cures to a silicone elastomer which may be used as a clear sealant which avoids discolouration and loss of adhesion upon aging.

18 Claims, No Drawings

(56) References Cited

U.S. PATENT DOCUMENTS

| | | |
|---|---|---|
| 2015/0045519 A1 | 2/2015 | Rutz et al. |
| 2015/0159051 A1 | 6/2015 | Kohl et al. |
| 2016/0340548 A1 | 11/2016 | Gubbels et al. |
| 2017/0022325 A1 | 1/2017 | Monteil et al. |
| 2017/0101564 A1 | 4/2017 | Choffat |
| 2018/0258316 A1 | 9/2018 | Lucas |
| 2021/0206938 A1 | 7/2021 | Ganachaud et al. |

FOREIGN PATENT DOCUMENTS

| | | | |
|---|---|---|---|
| CN | 1597828 A | 3/2005 | |
| CN | 1654584 A | 8/2005 | |
| CN | 102952270 A | 3/2013 | |
| CN | 103298888 A | 9/2013 | |
| CN | 103396757 A | 11/2013 | |
| CN | 103408941 A | 11/2013 | |
| CN | 105849213 A | 8/2016 | |
| CN | 104497579 B | 2/2017 | |
| EP | 38221 B1 | 11/1985 | |
| EP | 802222 A1 | 10/1997 | |
| EP | 802233 A2 * | 10/1997 | C08L 83/00 |
| EP | 1043356 A1 | 10/2000 | |
| EP | 1238005 B1 | 9/2004 | |
| EP | 3489010 A1 | 5/2019 | |
| JP | 2000345043 A | 12/2000 | |
| JP | 2015017277 A | 1/2015 | |
| WO | 2013130574 A1 | 9/2013 | |
| WO | 2019024430 A1 | 2/2019 | |
| WO | 2019190775 A1 | 10/2019 | |
| WO | 2019190776 A1 | 10/2019 | |
| WO | 2019200579 A1 | 10/2019 | |

OTHER PUBLICATIONS

Machine assisted English translation of CN104497579B obtained from https://patents.google.com/patent on Aug. 24, 2022, 11 pages.
Machine assisted English translation of CN1597824A obtained from https://patents.google.com/patent on Aug. 24, 2022, 8 pages.
Machine assisted English translation of CN1654584A obtained from https://patents.google.com/patent on Aug. 24, 2022, 9 pages.
Brook, M., "Silicon in Organic, Organometallic and Polymer Chemistry", John Wiley & Sons, Inc. (2000), pp. 284-287.
International Search Report for PCT/US2020/065475 dated Apr. 4, 2021, 3 pages.
International Search Report for PCT/CN2019/125816 dated Sep. 21, 2020, 3 pages.
International Search Report for PCT/CN2019/125817 dated Jul. 29, 2020, 3 pages.
International Search Report for PCT/CN2019/125815 dated Sep. 22, 2020, 3 pages.
International Search Report for PCT/CN2019/125814 dated Jul. 29, 2020, 3 pages.
International Search Report for PCT/CN2019/125820 dated Sep. 2, 2020, 4 pages.
Noll, W., Chemistry and Technology of Silicones, Academic Press Inc., New York, (1968) pp. 396-399.
Knipe et al. "In Situ Kinetics of Moisture-Reactive Acetoxysiloxane Sealants" Ind. Eng. Chem. Res. 2019, 58, 17266-17276.

* cited by examiner

SEALANT COMPOSITION

CROSS-REFERENCE TO RELATED APPLICATIONS

This application is the U.S. National Stage of and claims priority to International Application No. PCT/CN2019/125814 filed on 17 Dec. 2019, the contents of which is incorporated herein by reference.

FIELD OF THE INVENTION

This relates to a one-part room temperature vulcanisable (RTV) silicone composition containing a catalyst comprising (i) a titanate and/or zirconate and (ii) a metal carboxylate salt which cures to a silicone elastomer which may be used as a clear sealant which avoids discolouration and loss of adhesion upon aging.

BACKGROUND OF THE INVENTION

Room temperature vulcanizable (RTV) silicone rubber are well known. Neutral-curing silicone sealants were introduced with a view to avoiding the acidic by-products released during condensation cure. Neutral silicone sealants generally release an alcohol (e.g. methanol or ethanol) as they cure. They are generally utilised in the construction industry for high-tech applications, such as in window construction, and for sealing both indoor and outdoor joints. Given these end uses, the industry expects cured products characteristics having good long-term adhesion to substrates as well as durability without deterioration (non-yellowing, UV resistant).

Generally, such neutral-curing silicone sealants comprise an —OH end-blocked diorganopolysiloxane polymer or an alkoxy end-blocked polydiorganosiloxane which may have an alkylene link between the end silicon atoms and one or more suitable cross-linking agents designed to react with the —OH and/or alkoxy groups and thereby cross-link the composition to form an elastomeric sealant product. One or more additional ingredients such as catalysts, reinforcing fillers, non-reinforcing fillers, diluents (e.g. plasticisers and/or extenders), chain extenders, flame retardants, solvent resistant additives, biocides and the like are often also incorporated into these compositions as and when required. They may be one-part compositions or multiple-part compositions. One-part compositions are generally stored in a substantially anhydrous form to prevent premature cure. The main, if not sole source, of moisture in these compositions are the inorganic fillers, e.g. silica when present. Said fillers may be rendered anhydrous before inter-mixing with other ingredients or water/moisture may be extracted from the mixture during the mixing process to ensure that the resulting sealant composition is substantially anhydrous.

Titanate catalysts have been widely used to formulate skin or diffusion cured one-part condensation curing silicone elastomers. Skin or diffusion cure (e.g. moisture/condensation) occurs by the initial formation of a cured skin at the composition/air interface subsequent to the sealant/encapsulant being applied on to a substrate surface. Subsequent to the generation of the surface skin the cure speed is dependent on the speed of diffusion of moisture from the sealant/encapsulant interface with air to the inside (or core), and the diffusion of condensation reaction by-product/effluent from the inside (or core) to the outside (or surface) of the material and the gradual thickening of the cured skin over time from the outside/surface to the inside/core. One-part sealant compositions are therefore usually applied onto a substrate or into a crack between adjacent substrates in a layer that is ≤15 mm in thickness. Layers thicker than 15 mm can lead to uncured material being present in the cured product because surface moisture diffuses at a very slow rate to the deeper sections of the applied sealant.

Titanate catalysts may not efficiently catalyse the bulk cure of such formulations due to some of the titanium compounds used for catalysts can be inactivated due to reactions e.g. methoxysilanes present in the formulations as cross-linkers which form catalytically inactive precipitates. In order to achieve the desired cure speed in silicone compositions containing such alkoxy silane cross-linkers without inactivating the catalyst, it has become a practice to employ certain organic titanium compounds as the catalysts for the condensation reaction. The titanium compounds most generally preferred for this purpose are those derived from primary or secondary alcohols, for example, isopropyl alcohol and/or n-butyl alcohol. However, the titanium compounds employed in practice are often inadequate to promote a sufficiently rapid and/or deep cure and it is a practice to employ a chelating agent, for example, an acetyl acetonate as accelerator and stabilizer for the titanium compound. The chelating agent e.g. acetyl acetonate may be mixed with the titanium compound or reacted with it to provide a complex. These materials containing acetonate have the disadvantage of leading to a cured silicone product which has a yellow tint. It has long been desired to have a titanate catalysed sealant formulation which will provide sufficient speed of cure and a resulting clear, translucent or "water white" product which retains its translucency and lack of color during use and avoids the aforementioned yellow tint. However, this combined requirement has proved difficult to achieve in compositions containing alkoxy silane type cross-linkers.

BRIEF SUMMARY OF THE INVENTION

The disclosure herein seeks to provide a one-part room temperature vulcanisable (RTV) silicone composition which upon cure provides a clear sealant which avoids discolouration and loss of adhesion upon aging.

There is provided herein a one-part room temperature vulcanisable (RTV) silicone composition which comprises
  (a) an organopolysiloxane polymer having at least two hydroxyl or hydrolysable groups per molecule of the formula $$X_{3-n}R_nSi-(Z)_d-(O)_q-(R^1{}_ySiO_{(4-y)/2})_z-(SiR^1{}_2-Z)_d-Si-R_nX_{3-n} \quad (1)$$

in which each X is independently a hydroxyl group or a hydrolysable group, each R is an alkyl, alkenyl or aryl group, each $R^1$ is an X group, alkyl group, alkenyl group or aryl group and Z is a divalent organic group; d is 0 or 1, q is 0 or 1 and d+q=1; n is 0, 1, 2 or 3, y is 0, 1 or 2, and preferentially 2 and z is an integer such that said organopolysiloxane polymer has a viscosity of from 10,000 to 75,000 mPa·s at 25° C., alternatively from 10,000 to 60,000 mPa·s at 25° C.;
  (b) a reinforcing filler comprising or consisting of fumed or pyrogenic silica filler which may optionally be hydrophobically treated, in an amount of from about 5 to about 25 parts by weight per 100 parts by weight of organopolysiloxane polymer (a)
  (c) a silane adhesion promoter in an amount of from 0.10 to about 2.0 parts by weight per 100 parts by weight of organopolysiloxane polymer (a)

(d) a catalyst comprising (i) a titanate and/or zirconate and
   (ii) a metal carboxylate salt; and optionally (e) and/or
   (f) wherein
(e) is a cross-linker
(f) is a hydroxy scavenging agent selected from a disilazane or polysilazane.

There is also provided herein a method of making the above composition by mixing all the ingredients together.

There is also provided herein an elastomeric sealant material which is the cured product of the composition as hereinbefore described.

There is also provided a use of the aforementioned composition as a sealant in the facade, insulated glass, window construction, automotive, solar and construction fields.

There is also provided a method for filling a space between two substrates so as to create a seal therebetween, comprising:
a) providing a silicone composition as hereinbefore described, and either
b) applying the silicone composition to a first substrate, and bringing a second substrate in contact with the silicone composition that has been applied to the first substrate, or
c) filling a space formed by the arrangement of a first substrate and a second substrate with the silicone composition and curing the silicone composition.

DETAILED DESCRIPTION OF THE INVENTION

The concept of "comprising" where used herein is used in its widest sense to mean and to encompass the notions of "include" and "consist of".

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

The compositions are preferably room temperature vulcanisable compositions in that they cure at room temperature without heating but may if deemed appropriate be accelerated by heating.

Organopolysiloxane polymer (a) having at least two hydroxyl or hydrolysable groups per molecule has the formula $$X_{3-n}R_nSi-(Z)_d-(O)_q-(R^1{}_ySiO_{(4-y)/2})_z-(SiR^1{}_2-Z)_d-Si-R_nX_{3-n} \quad (1)$$

in which each X is independently a hydroxyl group or a hydrolysable group, each R is an alkyl, alkenyl or aryl group, each $R^1$ is an X group, alkyl group, alkenyl group or aryl group and Z is a divalent organic group;
d is 0 or 1, q is 0 or 1 and d+q=1; n is 0, 1, 2 or 3, y is 0, 1 or 2, and z is an integer such that said organopolysiloxane polymer (a) has a viscosity of from 10,000 to 75,000 mPa·s at 25° C., alternatively from 10,000 to 60,000 mPa·s at 25° C., in accordance with ASTM D 1084-16 using a Brookfield rotational viscometer with spindle CP-52 at 1 rpm.

Each X group of organopolysiloxane polymer (a) may be the same or different and can be a hydroxyl group or a condensable or hydrolyzable group. The term "hydrolyzable group" means any group attached to the silicon which is hydrolyzed by water at room temperature. The hydrolyzable group X includes groups of the formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —(CH$_2$CH$_2$O)$_2$CH$_3$ The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy. When d=1, n is typically 0 or 1 and each X is an alkoxy group, alternatively an alkoxy group having from 1 to 3 carbons, alternatively a methoxy or ethoxy group. In such a case organopolysiloxane polymer (a) has the following structure:

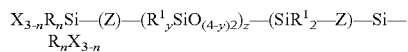

with R, $R^1$, Z, y and z being as described above, n being 0 or 1 and each X being an alkoxy group.

Each R is individually selected from alkyl groups, alternatively alkyl groups having from 1 to 10 carbon atoms, alternatively from 1 to 6 carbon atoms, alternatively 1 to 4 carbon atoms, alternatively methyl or ethyl groups; alkenyl groups alternatively alkenyl groups having from 2 to 10 carbon atoms, alternatively from 2 to 6 carbon atoms such as vinyl, allyl and hexenyl groups; aromatic groups, alternatively aromatic groups having from 6 to 20 carbon atoms, substituted aliphatic organic groups such as 3,3,3-trifluoropropyl groups aminoalkyl groups, polyaminoalkyl groups, and/or epoxyalkyl groups.

Each $R^1$ is individually selected from the group consisting of X or R with the proviso that cumulatively at least 2 X groups and/or $R^1$ groups per molecule are hydroxyl or hydrolysable groups. It is possible that some $R^1$ groups may be siloxane branches off the polymer backbone which branches may have terminal groups as hereinbefore described. Most preferred $R^1$ is methyl.

Each Z is independently selected from an alkylene group having from 1 to 10 carbon atoms. In one alternative each Z is independently selected from an alkylene group having from 2 to 6 carbon atoms; in a further alternative each Z is independently selected from an alkylene group having from 2 to 4 carbon atoms. Each alkylene group may for example be individually selected from an ethylene, propylene, butylene, pentylene and/or hexylene group.

Additionally n is 0, 1, 2 or 3, d is 0 or 1, q is 0 or 1 and d+q=1. In one alternatively when q is 1, n is 1 or 2 and each X is an OH group or an alkoxy group. In another alternative when d is 1 n is 0 or 1 and each X is an alkoxy group.

Organopolysiloxane polymer (a) has a viscosity of from 10,000 to 75,000 mPa·s at 25° C., alternatively from 10,000 to 60,000 mPa·s at 25° C., in accordance with ASTM D 1084-16 using a Brookfield rotational viscometer with spindle CP-52 at 1 rpm, z is therefore an integer enabling such a viscosity, alternatively z is an integer from 300 to 5000. Whilst y is 0, 1 or 2, substantially y=2, e.g. at least 90% alternatively 95% of $R^1{}_ySiO_{(4-y)/2}$ groups are characterized with y=2.

Organopolysiloxane polymer (a) can be a single siloxane represented by Formula (1) or it can be mixtures of organopolysiloxane polymers represented by the aforesaid formula. Hence, the term "siloxane polymer mixture" in respect to organopolysiloxane polymer (a) is meant to include any individual organopolysiloxane polymer (a) or mixtures of organopolysiloxane polymer (a).

The Degree of Polymerization (DP), (i.e. in the above formula substantially z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity.

Organopolysiloxane polymer (a) is present in the composition in an amount of from 10 to 60% by weight, alternatively 10 to 55%, alternatively 20 to 55% by weight of the composition.

The composition also comprises one or more finely divided, reinforcing fillers (b) such as fumed silica and/or precipitated silica including, for example, rice hull ash. Typically, the surface area of the reinforcing filler (b) is at least 50 m$^2$/g for fumed silica and/or precipitated silica. In the case of high surface area fumed silica and/or high surface area precipitated silica, these may have surface areas of from 75 to 400 m$^2$/g measured in accordance with the BET method in accordance with ISO 9277: 2010, alternatively of from 100 to 300 m$^2$/g in accordance with the BET method in accordance with ISO 9277: 2010, may be chosen for use.

The reinforcing fillers are present in the composition in an amount of from 5 to about 25 parts by weight per 100 parts by weight of organopolysiloxane polymer (a); alternatively, from 10 to about 20 parts by weight per 100 parts by weight of organopolysiloxane polymer (a).

Reinforcing filler (b) may be hydrophobically treated for example with one or more aliphatic acids, e.g. a fatty acid such as stearic acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other adhesive components. The surface treatment of the fillers makes them easily wetted by organopolysiloxane polymer (a). These surface modified fillers do not clump and can be homogeneously incorporated into the silicone polymer (a). This results in improved room temperature mechanical properties of the uncured compositions. The fillers may be pre-treated or may be treated in situ when being mixed with organopolysiloxane polymer (a).

Component (c) is a silane adhesion promoter. Suitable adhesion promoters may comprise alkoxysilanes of the formula $R^{14}{}_h Si(OR^{15})_{(4-h)}$, where subscript h is 1, 2, or 3, alternatively h is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^5$ is exemplified by methyl, ethyl, n-propyl, and iso-propyl.

Alternatively the adhesion promoter may be glycidoxypropyltrimethoxysilane or a multifunctional material obtained by reacting two or more of the above. For examples the reaction product of an alkylalkoxysilicone e.g. trimethoxymethylsilane; an aminoalkoxysilane, e.g. 3-aminopropyl trimethoxysilane and an epoxyalkoxysilane e.g. glycidoxypropyl trimethoxysilane; in a weight ratio of (i): (ii):(iii) of 0.1-6:0.1-5:1.

Examples of suitable adhesion promoters may include molecules of the structure

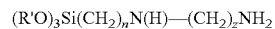

in which each $R^1$ may be the same or different and is an alkyl group containing from 1 to 10 carbon atoms, n is from 2 to 10 and z is from 2 to 10;

Silane adhesion promoter (c) is present in the composition in an amount of from 0.10 to about 2.0 parts by weight per 100 parts by weight of organopolysiloxane polymer (a); alternatively, in an amount of from 0.3 to about 1 parts by weight per 100 parts by weight of organopolysiloxane polymer (a).

Preferably, the speed of hydrolysis of the adhesion promoter should be lower than the speed of hydrolysis of the cross-linker in order to favour diffusion of the molecule towards the substrate rather than its incorporation in the product network.

Component (d) is a catalyst comprising (i) a titanate and/or zirconate and (ii) a metal carboxylate salt. The titanate and/or zirconate (i) in catalyst (d) chosen for inclusion in sealant composition as defined herein, depends upon the speed of cure required. Titanate and/or zirconate based catalysts may comprise a compound according to the general formula $Ti[OR^9]_4$ or $Zr[OR^9]_4$ where each $R^9$ may be the same or different and represents a monovalent, primary, secondary or tertiary aliphatic hydrocarbon group which may be linear or branched containing from 1 to 10 carbon atoms. Optionally the titanate and/or zirconate based catalysts may contain partially unsaturated groups. However, preferred examples of $R^9$ include but are not restricted to methyl, ethyl, propyl, isopropyl, butyl, tertiary butyl and a branched secondary alkyl group such as 2, 4-dimethyl-3-pentyl. Preferably, when each $R^9$ is the same, $R^9$ is an isopropyl, branched secondary alkyl group or a tertiary alkyl group, in particular, tertiary-butyl. Suitable examples include for the sake of example, tetra n-butyl titanate, tetra t-butyl titanate, tetra t-butoxy titanate, tetraisopropoxy titanate and diisopropoxydiethylacetoacetate titanate (as well as zirconate equivalents). Alternatively, the titanate/zirconate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate.

In the present disclosure catalyst (d) also comprises (ii) a metal carboxylate salt wherein the metal is selected from one or more of zinc, aluminium, bismuth iron and/or zirconium. The carboxylate groups are of the formula $R^{15}COO$— where $R^{15}$ is selected from hydrogen, alkyl groups, alkenyl groups, and aryl groups. Examples of useful alkyl groups for $R^{15}$ include alkyl groups having from 1 to 18 carbon atoms, alternatively 1 to 8 carbon atoms. Examples of useful alkenyl groups for $R^{15}$ include alkenyl groups having from 2 to 18 carbon atoms, alternatively 2 to 8 carbon atoms such as vinyl, 2-propenyl, allyl, hexenyl, and octenyl. Examples of useful aryl groups for $R^{15}$ include aryl groups having from 6 to 18 carbon atoms, alternatively 6 to 8 carbon atoms such as phenyl and benzyl. Alternatively, $R^{15}$ is methyl, 2-propenyl, allyl, and phenyl. Hence the metal carboxylate salt (ii) in catalyst (d) may be zinc (II) carboxylates, aluminium (III) carboxylates, bismuth (III) carboxylates and/or zirconium (IV) carboxylates, zinc (II) alkylcarboxylates, aluminium (III) alkylcarboxylates, bismuth (III) alkylcarboxylates and/or zirconium (IV) alkylcarboxylates or mixtures thereof. Specific examples of metal carboxylate salt (ii) in catalyst (d) include, zinc ethylhexanoate, bismuth ethylhexanoate zinc stearate, zinc undecylenate, zinc neodecanoate, and iron (III) 2-ethylhexanoate. The titanate and/or zirconate (i) and metal carboxylate salt (ii) of catalyst (d) is provided in a molar ratio of 1:4 to 4:1.

The catalyst (d) is typically present in an amount of from 0.33 to 5.3 parts by weight per 100 parts by weight of organopolysiloxane polymer (a), alternatively, from 0.33 to 4 parts by weight per 100 parts by weight of organopolysiloxane polymer (a), alternatively, from 0.4 to 3.3 parts by weight per 100 parts by weight of organopolysiloxane polymer (a).

Although not preferred, if deemed appropriate or necessary, optionally catalyst (e) may also additionally include a tin catalyst. The additional tin-based condensation catalyst may be any catalyst suitable for catalysing the cure of the composition. Said tin catalyst, if used, must be compatible with the other components of the catalyst (e).

As hereinbefore described the composition may optionally contain components (e) and/or (f), wherein
(e) is a cross-linker and
(f) a moisture scavenger selected from a disilazane or polysilazane hydroxy scavenging agent;

Cross-linker (e) is deemed optional as a selection of polymers proposed as polymer (a) in the above composition do not require a cross-linker in order to cure. Cross-linker (e), when present, may be selected from a silane having the structure

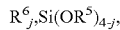

where each $R^5$ may be the same or different and is an alkyl group containing at least one carbon, alternatively from 1 to 20 carbons, alternatively from 1 to 10 carbons alternatively from 1 to 6 carbons. The value of j is 0 or 1. Whilst each $R^5$ group may be the same of different it is preferred that at least two $R^5$ groups are the same, alternatively at least three $R^5$ groups are the same and alternatively when j is 0 all $R^5$ groups are the same. Hence, specific examples of cross-linker (e) when j is zero include tetraethylorthosilicate, tetrapropylorthosilicate, tetra(n-)butylorthosilicate and tetra (t-)butylorthosilicate.

When j is 1 the group $R^6$ is present. $R^6$ is a silicon-bonded organic group selected from a substituted or unsubstituted straight or branched monovalent hydrocarbon group having at least one carbon, a cycloalkyl group, an aryl group, an aralkyl group or any one of the foregoing wherein at least one hydrogen atom bonded to carbon is substituted by a halogen atom, or an organic group having an epoxy group, a glycidyl group, an acyl group, a carboxyl group, an ester group, an amino group, an amide group, a (meth)acryl group, a mercapto group, an isocyanurate group or an isocyanate group. Unsubstituted monovalent hydrocarbon groups, suitable as $R^6$, may include alkyl groups e.g. methyl, ethyl, propyl, and other alkyl groups, alkenyl groups such as vinyl, cycloalkyl groups may include cyclopentane groups and cyclohexane groups. Substituted groups suitable in or as $R^6$, may include, for the sake of example, 3-hydroxypropyl groups, 3-(2-hydroxyethoxy)alkyl groups, halopropyl groups, 3-mercaptopropyl groups, trifluoroalkyl groups such as 3,3,3-trifluoropropyl, 2,3-epoxypropyl groups, 3,4-epoxybutyl groups, 4,5-epoxypentyl groups, 2-glycidoxyethyl groups, 3-glycidoxypropyl groups, 4-glycidoxybutyl groups, 2-(3,4-epoxycyclohexyl) ethyl groups, 3-(3,4-epoxycyclohexyl)alkyl groups, aminopropyl groups, N-methylaminopropyl groups, N-butylaminopropyl groups, N,N-dibutylaminopropyl groups, 3-(2-aminoethoxy)propyl groups, methacryloxyalkyl groups, acryloxyalkyl groups, carboxyalkyl groups such as 3-carboxypropyl groups, 10-carboxydecyl groups.

Specific examples of suitable cross-linkers (e) include but are not limited to vinyltrimethoxysilane, methyltrimethoxysilane, ethyltriethoxysilane, ethyltrimethoxysilane, propyltriethoxysilane, isobutyltriethoxysilane, isobutyltrimethoxysilane, vinyltriethoxysilane, phenyltriethoxysilane, phenyltrimethoxysilane, methyltris(isopropenoxy)silane or vinyltris(isopropenoxy)silane, 3-hydroxypropyl triethoxysilane, 3-hydroxypropyl trimethoxysilane, 3-(2-hydroxyethoxy)ethyltriethoxysilane, 3-(2-hydroxyethoxy)ethyltrimethoxysilane, chloropropyl triethoxysilane, 3-mercaptopropyl triethoxysilane, 3,3,3-trifluoropropyl triethoxysilane, 2,3-epoxypropyl triethoxysilane, 2,3-epoxypropyl trimethoxysilane, 3,4-epoxybutyl triethoxysilane, 3,4-epoxybutyl trimethoxysilane, 4,5-epoxypentyl triethoxysilane, 4,5-epoxypentyl trimethoxysilane, 2-glycidoxyethyl triethoxysilane, 2-glycidoxyethyl trimethoxysilane, 3-glycidoxypropyl triethoxysilane, 3-glycidoxypropyl trimethoxysilane, 4-glycidoxybutyl triethoxysilane, 4-glycidoxybutyl trimethoxysilane, 2-(3,4-epoxycyclohexyl) ethyl triethoxysilane, 3-(3,4-epoxycyclohexyl)ethyl triethoxysilane, aminopropyl triethoxysilane, aminopropyl trimethoxysilane, N-methylaminopropyl triethoxysilane, N-methylaminopropyl trimethoxysilane, N-butylaminopropyl trimethoxysilane, N,N-dibutylaminopropyl triethoxysilane, 3-(2-aminoethoxy)propyl triethoxysilane, methacryloxypropyl triethoxysilane, tris(3-triethoxysilylpropyl) isocyanurate, acryloxypropyl triethoxysilane, 3-carboxypropyl triethoxysilane and 10-carboxydecyl triethoxysilane.

Cross-linker (e) is optionally present in the composition. Hence, it may not be present, but when present, it is present in an amount ≤8 parts by weight per 100 parts by weight of organopolysiloxane polymer (a), i.e. in a range of from 0 to 8 parts by weight per 100 parts by weight of organopolysiloxane polymer (a).

Component (f) is a hydroxy scavenging agent selected from a disilazane or polysilazane. Any suitable disilazane or polysilazane hydroxy scavenging agent may be used, for example silazanes which may be linear or cyclic such as hexamethyldisilazane, hexamethylcyclotrisilazane. octamethyltetrasilazane, trimethyltriphenylcyclotrisilazane, trivinyltrimethylcyclotrisilazane. Component (f) may also be one or more and polysilazanes i.e. polymers containing repeating units such as arylensilazanes, such as phenylene silazanes, and alkylenesilazanes such as methylenesilazanes repeating units such as the specific examples are: Hexamethyldisilazane, hexamethylcyclotrisilazane, octamethyltetrasilazane, trimethyltriphenylcyclotrisilazane and trivinyltrimethylcyclotrisilazane.

The hydroxy scavenging agent (f) is optionally present in the composition. Hence, it may not be present, but when present, it is present in an amount ≤8 parts by weight per 100 parts by weight of organopolysiloxane polymer (a), i.e. in a range of from 0 to 8 parts by weight per 100 parts by weight of organopolysiloxane polymer (a).

Other additives may be used if necessary. These may include pigments, plasticisers, rheology modifiers, cure modifiers, and fungicides and/or biocides and the like; It will be appreciated that some of the additives are included in more than one list of additives. Such additives would then have the ability to function in all the different ways referred to.

Pigments are utilized to color the composition as required. Any suitable pigment may be utilized providing it is compatible with the composition. Pigments and/or colored (non-white) fillers, e.g. carbon black may be utilized to color the end adhesive product. When present carbon black will function as both a non-reinforcing filler and colorant.

The composition may comprise one or more liquid plasticizers/extenders (sometimes referred to as processing aids) in the form of a silicone or organic fluid which is unreactive with each of ingredients (a) to (f).

Examples of non-reactive silicone fluids useful as plasticizers and which may be included in the two-part composition, include polydiorganosiloxanes such as polydimethylsiloxane having terminal triorganosiloxy groups wherein the organic substituents are, for example, methyl, vinyl or phenyl or combinations of these groups. Such polydimethylsiloxanes can for example have a viscosity of from about 5 to about 100,000 mPa·s at 25° C. in accordance with ASTM D 1084-16 using a Brookfield rotational viscometer with spindle CP-52 at 1 rpm. When present, these can be in part A or in part B of the two-part composition with the cross-linker (ii) and catalyst.

Alternatively compatible organic plasticisers may be utilised additionally to or instead of the silicone fluid plasticiser include dialkyl phthalates wherein the alkyl group may be linear and/or branched and contains from six to 20 carbon atoms such as dioctyl, dihexyl, dinonyl, didecyl, diallanyl and other phthalates, and analogous adipate, azelate, oleate and sebacate esters; polyols such as ethylene glycol and its derivatives; and organic phosphates such as tricresyl phosphate and/or triphenyl phosphates.

Examples of extenders for use in compositions herein include mineral oil based (typically petroleum based) paraffinic hydrocarbons, mixtures of paraffinic and naphthenic hydrocarbons, paraffin oils comprising cyclic paraffins and non-cyclic paraffins and hydrocarbon fluids containing naphthenics, polycyclic naphthenics and paraffins, or polyalkylbenzenes such as heavy alkylates (alkylated aromatic materials remaining after distillation of oil in a refinery). Examples of such extenders are discussed in GB2424898 the content of which is hereby enclosed by reference.

Plasticiser is optional and may be present in an amount of up to 20 parts by weight per hundred parts of polymer (a).

Rheology modifiers which may be incorporated in moisture curable compositions according to the invention include silicone organic co-polymers such as those described in EP0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion to substrates, particularly plastic substrates.

Biocides may additionally be utilized in the composition if required. It is intended that the term "biocides" includes bactericides, fungicides and algicides, and the like. Suitable examples of useful biocides, which may be utilized in compositions as described herein, include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Otherbiocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl]methyl]-1H-1,2,4-triazole.

The fungicide and/or biocide may suitably be present in an amount of from 0 to 0.3% by weight of the composition and may be present in an encapsulated form where required such as described in EP2106418.

The composition as hereinbefore described is a one-part room temperature vulcanisable (RTV) silicone composition which may comprise
- 100 parts by weight of organopolysiloxane polymer (a);
- from about 5 to about 25 parts by weight of reinforcing filler (b);
- from 0.10 to about 2.0 parts by weight of silane adhesion promoter (c);
- from 0.33 to 5.3 parts by weight of catalyst (d);
- 0 to 8 parts by weight of cross-linker (e); and
- 0 to 8 parts by weight of hydroxy scavenging agent (f) and any suitable combination thereof.

Optional additives as described above may also be present in the composition if desired, for example from 0 to 20 parts by weight of plasticiser per 100 parts by weight of polymer (a).

The compositions are preferably room temperature vulcanisable compositions in that they cure at room temperature without heating, but may, if deemed appropriate, be accelerated by heating. There is also provided herein a method of making the above composition by mixing all the ingredients together.

The composition may be prepared by mixing the ingredients in any suitable order for example and by any suitable mixing means. For example, the composition may be prepared by initially mixing polymer and filler or polymer, plasticiser (if present) and filler together and then introducing the remaining ingredients in any suitable order. Typically mixing will at some point be carried out under vacuum to remove as much moisture/water as possible with a view to avoiding premature cure during storage.

A further embodiment is a method of forming an elastomeric mass between surfaces which is adherent to at least two such surfaces which method comprises introducing between the surfaces a mass of a moisture curable composition and curing the composition in the presence of moisture. There is also provided a method for filling a space between two substrates so as to create a seal therebetween, comprising:

a) providing a silicone composition as hereinbefore described, and either b) applying the silicone composition to a first substrate, and bringing a second substrate in contact with the silicone composition that has been applied to the first substrate, or c) filling a space formed by the arrangement of a first substrate and a second substrate with the silicone composition and curing the silicone composition.

Compositions according to the invention may be formulated as single part formulations which are stable in storage but cure on exposure to atmospheric moisture and may be employed in a variety of applications. These may include, for example in coating, sealant and encapsulating compositions for use in the facade, insulated glass, window construction, automotive, solar and construction fields. They are, however, particularly suitable for sealing joints, cavities and other spaces in articles and structures which are subject to relative movement. They are thus particularly suitable as glazing sealants and for sealing building structures. They have desired cure properties to provide cured seals of modulus sufficiently low for most industry standards and elongation to break which is sufficiently high for most industry standards.

Preferably, the adhesive/sealant is applied on to a substrate at room temperature in the form of a liquid or paste which turns back to a solid immediately providing an immediate green strength to the sealant prior/during condensation curing of the siloxane constituent which in time cures to a permanent solid elastomeric sealant/adhesive. The irreversible condensation curing process commences immediately upon contact of the constituents of component a) with the atmosphere/moisture but most of the irreversibly curing process of component a will take place at around or slightly above room temperature i.e. at a temperature in the region of from 5 to 35° C. Whilst the external surface of the composition cures in the presence of moisture in minutes/hours, the hardening of the bulk adhesive and subsequent permanent bonding to the surfaces by condensation curing of the siloxane component throughout the body of the applied adhesive/sealant as described in the present invention takes a few weeks to form but results in a surface which is smooth to the touch unlike traditional air-sealant interfaces which are comparatively tacky or sticky to the touch.

This disclosure also extends to an elastomeric product being the cured product of the one-part room temperature vulcanisable (RTV) silicone composition herein and the use of the one-part room temperature vulcanisable (RTV) silicone composition as an adhesive and/or sealant which forms an elastomeric body upon curing.

The one-part room temperature vulcanisable (RTV) silicone composition may be prepared by mixing all the ingredients together in amounts as specified to provide a composition which is stable in the absence of moisture and which cures when exposed to moisture. These one-part room temperature vulcanisable (RTV) silicone compositions are preferably prepared by mixing all the ingredients under anhydrous conditions. This means that the amounts of moisture in the ingredients used should be minimized and that the conditions of mixing should minimize the amounts of moisture allowed into the system. Excess moisture may have deleterious effects on the composition, such as causing curing in the storage package or reduced cured properties.

The one-part room temperature vulcanisable (RTV) silicone compositions may be prepared as a one-package system in which all the ingredients are mixed together and stored in an anhydrous state.

The one-part room temperature vulcanisable (RTV) silicone composition of this disclosure may be employed in a variety of applications, for example as coating, caulking and encapsulating materials. They are, however, particularly suitable for sealing joints, cavities and other spaces in articles and structures which are subject to relative movement, i.e. as a glazing sealant or sanitary sealant, as sealants for sealing building structures & building materials such as concrete and stone and for use in rainscreen cladding—(replacing mechanical fixations). Other applications include material assembly (e.g. bonding plastic substrates to other plastic materials, plastics to metal surfaces, plastic to glass bonding: such as PVC to glass in windows, metal to metal substrates and glass to glass substrates.

EXAMPLES

Compositions supporting the disclosure herein as well as comparative compositions using standard titanate catalysts were prepared using the compositions identified in Tables 1a and 1b below.

TABLE 1a composition of Examples determined parts by weight per 100 parts of Trimethoxysilyl capped PDMS polymer

| Ingredients | Ex. 1 | Ex. 2 |
|---|---|---|
| Trimethoxysilyl capped PDMS polymer, viscosity 65,000 mPa · s | 100 | 100 |
| Trimethyl terminated polydimethylsiloxane viscosity 1000 mPa · s | 12.58 | 12.58 |
| AEROSIL ® R812(S) treated fumed silica | 11.39 | 11.39 |
| methyltrimethoxysilane | 5.83 | 5.83 |
| Adhesion Promoter | 2.65 | 2.65 |
| Catalyst 1 | 3.97 | |
| Catalyst 2 | | 4.37 |

In Table 1a:

AEROSIL® R812(S) is a hexamethyldisilazane treated fumed silica, having a BET surface area of 300 m$^2$/g, from Evonik (manufacturers value);

catalyst 1 was a tetra isopropyl titanate:Ethylhexanoic acid zinc salt (Zn(EHA)$_2$)mixture in a ratio by weight of 2:1 (6 mmol of Ti and 3 mmol of Zn);

Catalyst 2 was a tetra tertiary butyl titanate:Ethylhexanoic acid zinc salt (Zn(EHA)$_2$) mixture in a ratio by weight of 2:1;

The adhesion promoter used was the reaction product of (i) trimethoxymethylsilane, (ii) 3-aminopropyl trimethoxysilane and (iii) glycidoxypropyl trimethoxysilane.

It will be appreciated that the provision of the amounts of ingredients in parts by weight relative to 100 parts Trimethoxysilane capped PDMS polymer does not require the total composition to add up to 100 as would have been necessary if using Wt. %.

TABLE 1b composition of Comparative Examples determined parts by weight per 100 parts of Trimethoxysilyl capped PDMS polymer

| Ingredients | Comp. 1 | Comp. 2 | Comp. 3 |
|---|---|---|---|
| Trimethoxysilyl capped PDMS polymer, viscosity 65,000 mPa · s | 100 | 100 | 100 |
| Trimethyl terminated polydimethylsiloxane viscosity 1000 mPa · s | 12.58 | 12.58 | 12.58 |
| AEROSIL ® R812(S) treated fumed silica | 11.39 | 11.39 | 11.39 |
| methyltrimethoxysilane | 5.83 | 5.83 | 5.83 |
| Adhesion Promoter | 2.65 | 2.65 | 2.65 |
| tetra isopropyl titanate | 2.25 | | |
| Tetra tertiary butyl titanate | | 2.65 | |
| Ethylhexanoic acid zinc salt (Zn(EHA)$_2$) | | | 1.72 |

In the compositions of Table 1b the catalyst consisted of 6 mmol of Ti and 3 mmol of Zn. The compositions were cured for 7 days at room temperature unless otherwise indicated and then were analysed for their physical properties. All testing in accordance with ASTM D412-98a(2002) e1 were undertaken using dumbbell shaped test pieces.

TABLE 2a

| Physical Properties of Examples | | | |
|---|---|---|---|
| Properties | Test Method | Ex. 1 | Ex. 2 |
| Tack Free Time (TFT) (min) | ASTM C679-15 | 24 | 14 |
| Cure in Depth (CID) (mm/3 d) | | 4.1 | 4.05 |
| Tensile Strength (MPa) | ASTM D412-98a(2002)e1 | 1.92 | 2.02 |
| Elongation (%) | ASTM D412-98a(2002)e1 | 342.96 | 345.99 |
| Modulus at 100% extension | ASTM D412-98a(2002)e1 | 0.72 | 0.75 |
| Shore A hardness | ASTM D2240-97 | 29.9 | 31.4 |
| Adhesion Aluminum Cohesive Failure (CF %) | ASTM C794-18 | 100 | 100 |
| Adhesion Aluminum 180° Peel Strength (N/m) | ASTM C794-18 | 5667.2 | 5898.4 |
| Adhesion Glass (CF %) | ASTM C794-18 | 100 | 100 |
| Adhesion Glass 180° Peel Strength (N/m) | ASTM C794-18 | 5257.4 | 4646.2 |
| Tensile Strength after aging at 180° C. for 7 days (MPa) | ASTM D412-98a(2002)e1 | 1.002 | 0.889 |
| Elongation after aging at 180° C. for 7 days (%) | ASTM D412-98a(2002)e1 | 300.817 | 263.957 |
| Shore A hardness after aging at 180° C. for 7 days | ASTM D2240-97 | 20 | 21.5 |

The cure in depth tests were undertaken to determine how far below the surface the sealant had hardened in 24 hours by filling a suitable container (avoiding the introduction of air pockets) with sealant, curing the sealant contained in the container for the appropriate period of time at room temperature (about 23° C.) and about 5000 relative humidity. After the appropriate curing time the sample is removed from the container and the height of the cured sample is measured.

The adhesion assessment results, were determined using the Dow Corporate Test method CTM 0293 which is publicly available and is based on ASTM D 903. Cohesive failure is Cohesive failure (CF) is observed when the coating itself breaks without detaching from the substrate (for example, steel plate). In some cases, a mixed failure mode may be observed; that is some areas peel-off (i.e. AF) while some remain covered with coating (i.e. CF). In such cases, the portions of surface displaying CF (% CF)

Samples were aged to assess their long-term adhesion properties and their propensity for yellowing.

The Colour L*a*b* analysis was carried out using a CM-700d spectrophotometer from Konica Minolta Sensing Co., Ltd. Japan. The b value relates to yellowing. Test pieces used were dumbbell shaped.

Long term adhesion was assessed using both UV and QUV aging techniques followed by using a 1800 peel test in accordance with ASTM C794-18 results. In the case of UV aging after 7 days curing at room temperature, samples were put into a UV aging test chamber, Model SF/ZN-T available from Hefei Saifor Test Equipment Co., Ltd. Which had glass sides. Samples were exposed to UVA-340 nm Lamp at a distance of 20 cm with the chamber temperature maintained at about 45° C.

QUV aging is a standard accelerated weathering testing test adapted to mimic the real weather conditions using both TABLE 2b

| Physical Properties of Comparative Examples | | | | |
|---|---|---|---|---|
| Properties | Test Method | Comp. 1 | Comp. 2 | Comp. 3 |
| Tack Free Time (TFT) (min) | ASTM C679-15 | 80 | 37 | >480 |
| Cure in Depth (CID) (mm/3 d) | | 4.08 | 3.85 | N.A. |
| Tensile Strength (MPa) | ASTMD412-98a(2002)e1 | 1.95 | 2.09 | 0.09 |
| Elongation (%) | ASTM D412-98a(2002)e1 | 352.82 | 357.15 | 13.79 |
| Modulus at 100% extension | ASTM D412-98a(2002)e1 | | | |
| Shore A hardness | ASTM D2240-97 | 27.2 | 29.5 | N.A. |
| Adhesion Aluminum (Al) (CF %) | ASTM C794-18 | 100 | 100 | 0 |
| Adhesion Al 180° Peel Strength (N/m) | ASTM C794-18 | 4287.2 | 5324.0 | <876 |
| Adhesion Glass (CF %) | ASTM C794-18 | 100 | 60 | 0 |
| Adhesion Glass 180° Peel Strength (N/m) | ASTM C794-18 | 4646.2 | 2837.1 | <876 |
| Tensile Strength after aging at 180° C. for 7 days (MPa) | ASTM D412-98a(2002)e1 | 0.902 | 1.072 | 1.236 |
| Elongation after aging at 180° C. for 7 days(%) | ASTM D412-98a(2002)e1 | 343.75 | 371.941 | 513.918 |
| Shore A hardness after aging at 180° C. for 7 days | ASTM D412-98a(2002)e1 | 16.5 | 18 | 13.5 |

It can be seen that the Examples provided faster cure speed (indicated by TFT) compared to the comparative examples. While the metal salt Zn(EHA)$_2$ didn't show obvious cure properties (Comp.3), it can have synergy effect when added to Titanate. (Ex. 1 and 2).

light and water spray. The aging process was undertaken in a QUV-SPRAY Model unit manufactured by Q-Lab. The aging process followed ASTM G151-10 and G155-13. (the machine was Model, QUV-SPRAY manufactured by Q-Lab, Model, QUV-SPRAY).

TABLE 3a

Colour Testing and Adhesion testing after Aging of Examples

| Properties | Test Method | Ex. 1 | Ex. 2 |
|---|---|---|---|
| Colour L*a*b* (after aging at 180° C. for 7 days) | | | |
| L* | | 77.73 | 79.82 |
| a* | | −2.37 | −2.78 |
| b* | | 21.29 | 17.22 |
| Adhesion GL UV 500 h (CF) (%) | ASTMC794-18 | 100 | 100 |
| Adhesion GL UV 500 h 180° Peel Strength (N/m) | ASTMC794-18 | 5043.7 | 5113.8 |
| Adhesion GL UV 1500 h (CF %) | ASTMC794-18 | 100 | 100 |
| Adhesion GL UV 1500 h 180° Peel Strength (N/m) | ASTMC794-18 | 4255.7 | 4150.6 |
| Adhesion GL UV 2000 h (CF %) | ASTMC794-18 | 100 | 100 |
| Adhesion GL UV 2000 h 180° Peel Strength (N/m) | ASTMC794-18 | 3747.8 | 4535.9 |
| Adhesion GL QUV 500 h (CF %) | ASTM C794-18 | 40 | 0 |
| Adhesion GL QUV 500 h 180° Peel Strength (N/m) | ASTM C794-18 | 3660.2 | 2767.1 |
| Adhesion AL QUV 500 h (CF %) | ASTM C794-18 | 100 | 100 |
| Adhesion AL QUV 500 h 180° Peel Strength (N/m) | ASTM C794-18 | 4080.5 | 4693.5 |
| Adhesion AL QUV 1000 h (CF %) | ASTM C794-18 | 80 | 100 |
| Adhesion AL QUV 1000 h 180° Peel Strength (N/m) | ASTM C794-18 | 4220.6 | 3852.9 |

TABLE 3b

Colour Testing and Adhesion testing after Aging of Comparative Examples

| Properties | Test Method | Comp. 1 | Comp. 2 | Comp. 3 |
|---|---|---|---|---|
| Colour L*a*b* (180° C. 7 d) | | | | |
| L* | | 74.38 | 76.96 | 79.68 |
| a* | | −0.99 | −1.97 | −2.8 |
| b* | | 30.89 | 26.18 | 14.23 |
| Adhesion GL UV 500 h (CF %) | ASTMC794-18 | 100 | 100 | 0 |
| Adhesion GL UV 500 h 180° Peel Strength (N/m) | ASTMC794-18 | 3064.8 | 3782.8 | 665.5 |
| Adhesion GL UV 1500 h (CF %) | ASTMC794-18 | 100 | 80 | 0 |
| Adhesion GL UV 1500 h 180° Peel Strength (N/m) | ASTMC794-18 | 2119.1 | 1453.6 | 0.0 |
| Adhesion GL UV 2000 h (CF %) | ASTMC794-18 | 100 | 0 | 0 |
| Adhesion GL UV 2000 h 180° Peel Strength (N/m) | ASTMC794-18 | 2627.0 | 945.7 | 0.0 |
| Adhesion GL QUV 500 h (CF %) | ASTMC794-18 | 0 | 0 | 100 |
| Adhesion GL QUV 500 h 180° Peel Strength (N/m) | ASTMC794-18 | 262.7 | 262.7 | 3152.3 |
| Adhesion AL QUV 500 h (CF %) | ASTMC794-18 | 50 | 100 | 100 |
| Adhesion AL QUV 500 h 180° Peel Strength (N/m) | ASTMC794-18 | 3117.3 | 3432.5 | 3502.6 |
| Adhesion AL QUV 1000 h (CF %) | ASTMC794-18 | 0 | 95 | 0 |
| Adhesion AL QUV 1000 h 180° Peel Strength (N/m) | ASTMC794-18 | 1506.1 | 2942.2 | 980.7 |

It can be seen that, in the coloration testing after aging, the examples in accordance with the disclosure clearly show a lower value for b* indicating less yellowing than the comparatives using previous catalysts. It will also be appreciated that the compositions as described herein provide elastomers which perform better in the peel testing after aging than the comparative examples.

What is claimed is:

1. A one-part room temperature vulcanisable (RTV) silicone composition comprising:
    (a) an organopolysiloxane polymer having at least two hydroxyl or hydrolysable groups per molecule and of the general formula (1)

in which each X is independently a hydroxyl group or a hydrolysable group, each R is an alkyl, alkenyl or aryl group, each $R^1$ is an X group, alkyl group, alkenyl group or aryl group and Z is a divalent organic group; d is 0 or 1, q is 0 or 1 and (d+q)=1; n is 0, 1, 2 or 3, y is 0, 1 or 2, or optionally y is 2, and z is an integer such that organopolysiloxane polymer (a) has a viscosity of from 10,000 to 75,000 mPa·s at 25° C., or optionally from 10,000 to 60,000 mPa·s at 25° C.;
    (b) a reinforcing filler comprising or consisting of fumed or pyrogenic silica filler which is optionally hydrophobically treated, in an amount of from about 5 to about 25 parts by weight per 100 parts by weight of organopolysiloxane polymer (a);
    (c) a silane adhesion promoter, in an amount of from about 0.10 to about 2.0 parts by weight per 100 parts by weight of organopolysiloxane polymer (a); and
    (d) a catalyst comprising (i) a titanate and/or zirconate and (ii) a metal carboxylate salt in an amount of from about 0.33 to 5.3 parts by weight per 100 parts by weight of organopolysiloxane polymer (a); and optionally, further comprising:
    (e) a cross-linker; and/or
    (f) a hydroxy scavenging agent selected from a disilazane or polysilazane.

2. The one-part room temperature vulcanisable (RTV) silicone composition in accordance with claim 1, wherein organopolysiloxane polymer (a) is of the general formula

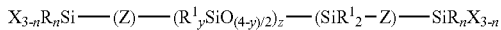

wherein n is 0 or 1, each of R, Z, $R^1$, y, and z is as defined above, and each X is an alkoxy group.

3. The one-part room temperature vulcanisable (RTV) silicone composition in accordance with claim 1, wherein the titanate (i) is selected from the group consisting of tetra-n-butyl titanate, tetra-isopropyl titanate, tetra-(2-ethylhexyl) titanate, and combinations thereof, and optionally wherein catalyst (d) is chelated.

4. The one-part room temperature vulcanisable (RTV) silicone composition in accordance with claim 1, wherein the metal of the metal carboxylate salt (ii) is selected from the group consisting of zinc, aluminium, bismuth, zirconium, and combinations thereof.

5. The one-part room temperature vulcanisable (RTV) silicone composition in accordance with claim 1, wherein the metal carboxylate salt (ii) and is selected from the group consisting of zinc (II) carboxylates, aluminium (III) carboxylates, bismuth (III) carboxylates, zirconium (IV) carboxylates, zinc (II) alkylcarboxylates, aluminium (III) alkylcarboxylates, bismuth (III) alkylcarboxylates, zirconium (IV) alkylcarboxylates, and combinations thereof.

6. The one-part room temperature vulcanisable (RTV) silicone composition in accordance with claim 1, wherein the metal carboxylate salt (ii) and is selected from the group consisting of zinc ethylhexanoate, bismuth ethylhexanoate, zinc stearate, zinc undecylenate, zinc neodecanoate, and iron (III) 2-ethylhexanoate.

7. The one-part room temperature vulcanisable (RTV) silicone composition in accordance with claim 1, wherein the titanate and/or zirconate (i) and the metal carboxylate salt (ii) of catalyst (d) is provided in a molar ratio of 1:4 to 4:1.

8. The one-part room temperature vulcanisable (RTV) silicone composition in accordance with claim 1, wherein the composition comprises:
from 0 to 8 parts by weight of cross-linker (e) per 100 parts by weight of organopolysiloxane polymer (a); and
from 0 to 8 parts by weight of hydroxy scavenging agent (f) per 100 parts by weight of organopolysiloxane polymer (a);
provided at least one of components (e) or (f) is present.

9. The one-part room temperature vulcanisable (RTV) silicone composition in accordance with claim 1, wherein the composition additionally comprises one or more plasticisers.

10. A method of making the one-part room temperature vulcanisable (RTV) silicone composition in accordance with claim 1, the method comprising mixing all of the ingredients together.

11. An elastomeric sealant material which is the cured product of the one-part room temperature vulcanisable (RTV) silicone composition in accordance with claim 1.

12. The elastomeric sealant material in accordance with claim 11, which is a clear sealant.

13. A sealant suitable for use in the facade, insulated glass, window construction, automotive, solar and construction fields, wherein the sealant comprises or is formed from the one-part room temperature vulcanisable (RTV) silicone composition in accordance with claim 1.

14. A method for filling a space between two substrates so as to create a seal therebetween, the method comprising:
a) providing the one-part room temperature vulcanisable (RTV) silicone composition in accordance with claim 1, and either b) or c);
b) applying the silicone composition to a first substrate, and bringing a second substrate in contact with the silicone composition that has been applied to the first substrate, or
c) filling a space formed by the arrangement of a first substrate and a second substrate with the silicone composition and curing the silicone composition.

15. The one-part room temperature vulcanisable (RTV) silicone composition in accordance with claim 1, wherein the (i) titanate and/or zirconate comprises tetra isopropyl titanate and the (ii) metal carboxylate salt comprises ethylhexanoic acid zinc.

16. The one-part room temperature vulcanisable (RTV) silicone composition in accordance with claim 1, wherein the (i) titanate and/or zirconate comprises tetra tertiary butyl titanate and the (ii) metal carboxylate salt comprises ethylhexanoic acid zinc salt.

17. The one-part room temperature vulcanisable (RTV) silicone composition in accordance with claim 1, wherein the (i) titanate and/or zirconate and the (ii) metal carboxylate salt of catalyst (d) is provided in a weight ratio of 2:1.

18. The one-part room temperature vulcanisable (RTV) silicone composition in accordance with claim 1, the (c) silane adhesion promoter is a reaction product of trimethoxymethylsilane, 3-aminopropyl trimethoxysilane, and glycidoxypropyl trimethoxysilane.

* * * * *